(12) United States Patent
Larsson

(10) Patent No.: US 12,447,607 B2
(45) Date of Patent: Oct. 21, 2025

(54) METHOD OF HANDLING CARRIER BY MEANS OF MOBILE ROBOT, CONTROL SYSTEM AND MOBILE ROBOT

(71) Applicant: ABB Schweiz AG, Baden (CH)

(72) Inventor: Jonas Larsson, Västerås (SE)

(73) Assignee: ABB Schweiz AG, Baden (CH)

( * ) Notice: Subject to any disclaimer, the term of this patent is extended or adjusted under 35 U.S.C. 154(b) by 225 days.

(21) Appl. No.: 18/252,944

(22) PCT Filed: Nov. 20, 2020

(86) PCT No.: PCT/EP2020/082880
§ 371 (c)(1),
(2) Date: May 15, 2023

(87) PCT Pub. No.: WO2022/106021
PCT Pub. Date: May 27, 2022

(65) Prior Publication Data
US 2023/0415331 A1    Dec. 28, 2023

(51) Int. Cl.
*B25J 9/00* (2006.01)
*B25J 5/00* (2006.01)
(Continued)

(52) U.S. Cl.
CPC .............. *B25J 9/0093* (2013.01); *B25J 5/007* (2013.01); *B25J 13/08* (2013.01); *G05D 1/021* (2013.01)

(58) Field of Classification Search
CPC .......... B25J 9/0093; B25J 5/007; B25J 13/08; G05D 1/021; G05D 1/0094
(Continued)

(56) References Cited

U.S. PATENT DOCUMENTS

2010/0224427 A1* 9/2010 Nuchter ................ B60B 19/125
                                                        180/7.1
2017/0281441 A1* 10/2017 Fich .......................... A61G 7/08
(Continued)

FOREIGN PATENT DOCUMENTS

CN      108356834 A      8/2018
EP      2236251 A1      10/2010
(Continued)

OTHER PUBLICATIONS

Park et al.; KR20180038871.Translate; LG Electronics Inc; Robot for Airport and Method Thereof. (Year: 2018).*
(Continued)

*Primary Examiner* — B M M Hannan
(74) *Attorney, Agent, or Firm* — Whitmyer IP Group LLC

(57) ABSTRACT

A method of handling a carrier by means of a mobile robot including a body having a base; a traction arrangement; at least one manipulator; and at least one end effector movable relative to the base; wherein the mobile robot is configured to perform an omnidirectional motion of the base relative to a surface; the method including obtaining environment data of a carrier positioned on the surface by means of an environment sensor; determining a handle position of at least one handle of the carrier based on the environment data; positioning each end effector in relation to at least one handle based on the one or more handle positions; securing each end effector to the at least one handle; and moving the mobile robot and the carrier in common over the surface by means of the mobile robot.

12 Claims, 9 Drawing Sheets

(51) Int. Cl.
*B25J 13/08* (2006.01)
*G05D 1/00* (2006.01)

(58) Field of Classification Search
USPC .......................................................... 700/245
See application file for complete search history.

(56) References Cited

U.S. PATENT DOCUMENTS

2017/0348854 A1* 12/2017 Oleynik ................. A47J 47/02
2018/0281178 A1 10/2018 Jacobsen
2022/0073105 A1* 3/2022 Osawa ..................... G06N 3/08

FOREIGN PATENT DOCUMENTS

| JP | 2008246596 A | 10/2008 |
| JP | 2018122829 A | 8/2018 |
| KR | 1020180038871 A | 4/2018 |

OTHER PUBLICATIONS

European Office Action; Application No. 20 811 293.8; Completed: Sep. 9, 2024; 7 Pages.
Masaki, Takahashi, et al.; Developing a mobile robot for transport applications in the hospital domain; Robotics and Autonomous Systems Journal Home Page Elsevier B.V.; Mar. 27, 2010; 11 Pages.
PCT International Search Report and Written Opinion of the International Searching Authority; Application No. PCT/EP2020/082880; Completed: Jun. 21, 2021; Mailing Date: Jun. 28, 2021; 12 Pages.
Chinese First Office Action; Application No. 2020801079758; Completed: Nov. 8, 2024; 7 pages.
International Preliminary Report on Patentability; Application No. PCT/EP2020/082880; Completed: May 16, 2023; 6 Pages.
Chinese Second Office Action; Application No. 202080107975.8; Completed: Apr. 18, 2025; 14 Pages.

\* cited by examiner

METHOD OF HANDLING CARRIER BY MEANS OF MOBILE ROBOT, CONTROL SYSTEM AND MOBILE ROBOT

TECHNICAL FIELD

The present disclosure generally relates to robotic handling of carriers. In particular, a method of handling a carrier by means of a mobile robot, a control system for controlling a mobile robot to handle a carrier, and a mobile robot comprising such control system, are provided.

BACKGROUND

People are spending time to move carts, trolleys, beds, or other types of carriers between two locations in many different situations. Today, robotic solutions for moving carriers are only used in a fraction of these situations. Robotic solutions are usually employed where logistics flows are very controlled and where logistics requirements are very static (do not vary over time).

To replace carriers, such as carts, trolleys or beds, with mobile robots is typically too costly. Factories, warehouses, hospitals, etc. can have hundreds or thousands of such carriers. In addition, these carriers often stand still most of time. Thus, if such carriers are replaced with mobile robots, the mobile robots would be poorly utilized.

Traditional solutions with fewer-than-carts AGVs (Automated Guided Vehicle) that can pick up a cart by lifting it from below and move it between locations have several major disadvantages. For example, an AGV cannot pick up all kinds of carriers, i.e., it requires a special design of carrier that fits with the AGV. It would typically require a significant cost to replace or rebuild existing carriers made for manual transport. Furthermore, many such AGVs must be designed to carry the complete weight/size of the carrier and its content in a stable and safe way. The AGV might for example have to lift the carrier high in order to be able to create a clear sight for its sensors.

KR 20180038871 A discloses an airport robot for helping movement of an airport cart. The robot comprises a travel driving portion for moving the robot, an object recognition portion for sensing the cart located near the robot, and a coupling portion for coupling with the cart.

Most types of carriers are made for humans to push or pull. To this end, such carriers often comprise similar types of handles at a similar height above the floor.

SUMMARY

One object of the present disclosure is to provide a method of handling a carrier by means of a mobile robot, which method enables an efficient handling of carriers by means of a mobile robot.

A further object of the present disclosure is to provide a method of handling a carrier by means of a mobile robot, which method enables a common navigation of the mobile robot and the carrier in compact spaces.

A still further object of the present disclosure is to provide a method of handling a carrier by means of a mobile robot, which method enables a flexible handling of carriers by means of a mobile robot.

A still further object of the present disclosure is to provide a method of handling a carrier by means of a mobile robot, which method enables handling of a wide range of different types of carriers by means of the mobile robot.

A still further object of the present disclosure is to provide a method of handling a carrier by means of a mobile robot, which method enables a cost effective handling of carriers by means of a mobile robot.

A still further object of the present disclosure is to provide a method of handling a carrier by means of a mobile robot, which method enables a safe handling of a carrier by means of a mobile robot.

A still further object of the present disclosure is to provide a method of handling a carrier by means of a mobile robot, which method enables a smaller footprint of the mobile robot.

A still further object of the present disclosure is to provide a method of handling a carrier by means of a mobile robot, which method solves several or all of the foregoing objects in combination.

A still further object of the present disclosure is to provide a control system for controlling a mobile robot to handle a carrier, which control system solves one, several or all of the foregoing objects in combination.

A still further object of the present disclosure is to provide a mobile robot solving one, several or all of the foregoing objects.

According to one aspect, there is provided a method of handling a carrier by means of a mobile robot, the mobile robot comprising a body having a base; a traction arrangement configured to move the body over a surface; at least one manipulator connected to the base; and at least one end effector movable relative to the base by means of the at least one manipulator; wherein the mobile robot is configured to perform an omnidirectional motion of the base relative to the surface; the method comprising obtaining environment data of a carrier positioned on the surface by means of an environment sensor; determining a handle position of at least one handle of the carrier based on the environment data; positioning each end effector in relation to at least one handle based on the one or more handle positions; securing each end effector to the at least one handle; and moving the mobile robot and the carrier in common over the surface by means of the mobile robot.

The method exploits the fact that carriers often comprise similar types of handles for humans to move the carriers. The method provides a flexible and cost effective solution that has the potential to be a disruptive solution for flexible small-batch logistics.

The method utilizes one or more handles of the carrier as the only connection point(s) between the mobile robot and the carrier. The method can therefore be carried out with no modification of the carriers for being moved by the mobile robot.

The mobile robot and the carrier may be moved in common in order to transport a load carried by the carrier from one location to another. Alternatively, or in addition, the mobile robot and the carrier may be moved in common in order to return an empty carrier from one location to another. When the at least one end effector is secured to the handle such that the mobile robot and the carrier move in common, the mobile robot and the carrier form a robot carrier system.

The method may further comprise moving the mobile robot and the carrier in common over the surface by means of an omnidirectional motion of the base. The omnidirectional motion enables the robot carrier system to be moved with three degrees of freedom, namely in an arbitrary direction along the surface at the same time as the base rotates in an arbitrary direction.

By means of the omnidirectional capability of the mobile robot, less space is required for the mobile robot to move in common with the carrier, e.g., during navigation along a path, at pickup of the carrier and/or at delivery of the carrier. Moreover, the omnidirectional motion of the base enables dynamic forces between the mobile robot and the carrier to be reduced. In addition, the omnidirectional motion of the base provides an agile navigation of the robot carrier system. A further advantage associated with the omnidirectional capability of the mobile robot is that the mobile robot can thereby handle all types of wheel configurations of the carrier, for example including four caster carrier wheels and any mix of caster carrier wheels and fixed direction carrier wheels.

The method may employ a mobile robot of any type according to the present disclosure. For example, the traction arrangement may comprise at least two robot wheels having a tire. Alternatively, or in addition, each end effector may be a gripper. The one or more grippers may firmly grip one or more handles of the carrier.

The method may further comprise determining a handle orientation of each handle of the carrier based on the environment data; and positioning each end effector in relation to at least one handle based on the one or more handle orientations, prior to securing each end effector to the at least one handle.

The method may further comprise determining a carrier navigation point in relation to the mobile robot; and controlling movements of the mobile robot based on the carrier navigation point when the mobile robot moves in common with the carrier. By controlling movements of the robot carrier system based on the carrier navigation point, a uniquely agile navigation is provided.

In case the carrier comprises two caster carrier wheels and two fixed direction carrier wheels, the carrier navigation point may be set anywhere between the two fixed direction carrier wheels. In case the carrier comprises four caster carrier wheels, the navigation point may be set arbitrarily, for example in the mobile robot, in a geometrical center point of the carrier, or at a center with respect to a carrier wheelbase.

The carrier navigation point may be determined based on the environment data. Alternatively, or in addition, the carrier navigation point may be determined in dependence of a type of the carrier. The type of the carrier may be determined based on the environment data or may be communicated to the mobile robot.

As a further alternative, the carrier navigation point may be determined based on a current location of the robot carrier system in a map. For example, if the robot carrier system is to pass through a door opening, the carrier navigation point may be set in a front region of the carrier. A determination of the current location of the robot carrier system in the map may in turn be made by means of navigation sensors of the mobile robot, such as one or more lidars.

The method may further comprise determining a wheel configuration of the carrier; and controlling movements of the mobile robot based on the wheel configuration when the mobile robot moves in common with the carrier. The wheel configuration may be determined based on the environment data. This determination may be made directly, e.g., by machine vision by means of an image sensor, or indirectly, e.g. via reading of a visual code associated with the carrier and containing information regarding the wheel configuration. The machine vision can be improved by artificial intelligence.

Alternatively, the wheel configuration may be determined by means of test movements of the robot carrier system. By analyzing forces in the traction arrangement during the test movements, the wheel configuration of the carrier can be determined. The wheel configuration may alternatively be communicated to the mobile robot.

The obtaining of environment data may comprise reading a visual code provided on the carrier by means of the environment sensor. The method may further comprise extracting information from the visual code. In this case, the environment sensor may be an image sensor and the environment data may be image data obtained by the image sensor. The visual code may comprise information regarding the handle position. Alternatively, or in addition, the visual code may comprise information regarding the wheel configuration of the carrier. The visual code may for example be a QR (quick response) code.

The method may further comprise obtaining environment data of a positioning feature on the carrier having a predetermined feature position in relation to the at least one handle position, determining the feature position by means of processing of the environment data, and determining the at least one handle position based on the feature position. Thus, when the feature position is determined, the handle position can be determined based on the known offset from the feature position.

In this case, the environment sensor may be an image sensor, the environment data may be image data obtained by the image sensor, and the feature position may be determined by means of image processing of the image data. The determination of the feature position by means of image processing of the image data may be made be made directly, e.g., by machine vision by means of the image sensor. Alternatively, or in addition, the positioning feature may be constituted by the visual code. Recognition of one or more positioning features by means of machine vision provides a robust and fail-safe way to determine the feature position. The positioning feature may be a visual code, a characteristic structure of the carrier, or some other type of marker or tag.

The method may, however, alternatively comprise a determination of the at least one handle position by means of machine vision, i.e. without relying on a dedicated positioning feature added to the carrier. Environment data in the form of a 3D point cloud can be analyzed to find the handle position and/or the handle orientation.

The at least one manipulator may comprise a link rotatable about a substantially horizontal, or horizontal, axis. In this case, the method may further comprise reducing a support of the link after securing each end effector to the at least one handle. This axis may be substantially perpendicular to, or perpendicular to, a separating direction between the base and the carrier of the robot carrier system. In this way, the mobile robot can utilize a support provided by the carrier for stabilization. This in turn enables a reduction of a footprint of the mobile robot. In addition, the movements of the mobile robot in common with the carrier becomes more smooth over uneven surfaces.

According to a further aspect, there is provided a control system for controlling a mobile robot to handle a carrier, the mobile robot comprising a body having a base; a traction arrangement configured to move the body over a surface; at least one manipulator connected to the base; and at least one end effector movable relative to the base by means of the at least one manipulator; wherein the mobile robot is configured to perform an omnidirectional motion of the base relative to the surface; the control system comprising at least one data processing device and at least one memory having a computer program stored thereon, the computer program comprising program code which, when executed by the at least one data processing device, causes the at least one data processing device to perform the steps of receiving, from an environment sensor, environment data of a carrier positioned on the surface; determining a handle position of at least one handle of the carrier based on the environment data; commanding the at least one manipulator to position each end effector in relation to at least one handle based on the one or more handle positions; commanding the at least one end effector to secure to the at least one handle; and commanding the mobile robot to move in common with the carrier over the surface.

The computer program may further comprise program code which, when executed by the at least one data processing device, causes the at least one data processing device to perform, or command performance of, one or more steps according to the method of the first aspect.

The computer program may further comprise program code which, when executed by the at least one data processing device, causes the at least one data processing device to perform the steps of determining a handle orientation of each handle of the carrier based on the environment data; and commanding the at least one manipulator to position each end effector in relation to at least one handle based on the one or more handle orientations, prior to securing each end effector to the at least one handle.

The computer program may further comprise program code which, when executed by the at least one data processing device, causes the at least one data processing device to perform the steps of determining a carrier navigation point in relation to the mobile robot; and controlling movements of the mobile robot based on the carrier navigation point when the mobile robot moves in common with the carrier.

The computer program may further comprise program code which, when executed by the at least one data processing device, causes the at least one data processing device to perform the step of determining the carrier navigation point based on the environment data. Alternatively, or in addition, the computer program may further comprise program code which, when executed by the at least one data processing device, causes the at least one data processing device to perform the step of determining the carrier navigation point in dependence of a type of the carrier.

The computer program may further comprise program code which, when executed by the at least one data processing device, causes the at least one data processing device to perform the steps of determining a wheel configuration of the carrier; and controlling movements of the mobile robot based on the wheel configuration when the mobile robot moves in common with the carrier.

The computer program may further comprise program code which, when executed by the at least one data processing device, causes the at least one data processing device to perform the step of determining the wheel configuration based on the environment data.

The computer program may further comprise program code which, when executed by the at least one data processing device, causes the at least one data processing device to perform the steps of commanding the environment sensor to read a visual code provided on the carrier; and extracting information from the visual code. In this case, the environment sensor may be an image sensor and the environment data may be image data obtained by the image sensor.

The computer program may further comprise program code which, when executed by the at least one data processing device, causes the at least one data processing device to perform the steps of receiving, from the environment sensor, environment data of a positioning feature on the carrier having a predetermined feature position in relation to the at least one handle position; determining the feature position by means of processing of the environment data; and determining the at least one handle position based on the feature position. In this case, the environment sensor may be an image sensor, the environment data may be image data obtained by the image sensor, and the feature position may be determined by means of image processing of the image data.

According to a further aspect, there is provided a mobile robot comprising the body having the base; the traction arrangement configured to move the body over the surface; the at least one manipulator connected to the base; the at least one end effector movable relative to the base by means of the at least one manipulator; and the control system according to the present disclosure; wherein the mobile robot is configured to perform an omnidirectional motion of the base relative to the surface. By means of the mobile robot, carriers having standard handles for humans can be moved easily.

The omnidirectional motion of the base can be achieved in different ways. According to one example, the mobile robot comprises at least three robot wheels, where at least two of the robot wheels are independently steerable robot wheels, and where at least one of the robot wheels is also a traction robot wheel. The at least three robot wheels then provide three degrees of freedom. In this case, the base may be fixed to the body. The body, the base and the robot wheels may be constituted by an automated guided vehicle, AGV.

According to a further example, the mobile robot comprises a differential drive, e.g., two parallel traction robot wheels or two parallel traction tracks in combination with a base rotatable relative to the body about a vertical axis. In this case, the differential drive provides two degrees of freedom and the rotation of the base provides a third degree of freedom. Also in this case, the body, the base and the robot wheels may be constituted by an AGV.

The omnidirectional motion of the base could alternatively be achieved by means of Mecanum wheels. However, Mecanum wheels are a far less attractive option due to their complicated design, sensitivity to surface roughness, and high noise level.

The end effector may be firmly secured to various handles for humans in order to move a cart, a trolley, a bed or other similar carrier. The end effector can be secured to handles of a wide range of such carriers without requiring any modification of the carriers. Each end effector may be a gripper. The one or more grippers may firmly grip one or more handles of the carrier.

The manipulator may be movable in three or more axes, such as in six or seven axes. The at least one manipulator may be configured to rotate each end effector about a horizontal axis. This axis may be substantially parallel with, or parallel with, a separating direction between the base and the carrier of the robot carrier system. By means of this feature, the end effector can be secured to both horizontal handles and vertical handles.

The mobile robot may comprise two manipulators, each comprising an end effector. By securing two end effectors to one or more handles of the carrier (either to the same handle or to two different handles of the carrier) with a horizontal separation between the end effectors, an improved maneuverability and stability of the robot carrier system is created. The mobile robot can thereby have full control over the carrier in a horizontal plane. The two manipulators may comprise a vertical degree of freedom for adjusting a height of the end effectors, a degree of freedom for adjusting a horizontal distance between the end effectors, and a horizontal degree of freedom for adjusting an orientation of each end effector.

The at least one manipulator may comprise a link rotatable about a substantially horizontal, or horizontal, axis. In this case, the computer program may further comprise program code which, when executed by the at least one data processing device, causes the at least one data processing device to perform the step of commanding the manipulator to reduce a support of the link after securing each end effector to the at least one handle. This axis may be substantially perpendicular to, or perpendicular to, a separating direction between the base and the carrier of the robot carrier system.

The traction arrangement may comprise at least two robot wheels having a tire. Thus, the traction arrangement may comprise a plurality of robot wheels that are not Mecanum wheels.

The environment sensor may comprise an electromagnetic sensor, such as a radar or lidar, or a light sensor, such as a camera. The mobile robot may further comprise the environment sensor. It is however also possible to provide one or more environment sensors external to the mobile robot. For example, a plurality of stationary environment sensors, such as cameras, may be arranged to monitor an area where one or more carriers are provided. Environment data of one or more carriers obtained by such environment sensors can then be wirelessly communicated to the mobile robot.

BRIEF DESCRIPTION OF THE DRAWINGS

Further details, advantages and aspects of the present disclosure will become apparent from the following description taken in conjunction with the drawings, wherein:

FIG. 1b: schematically represents a top view of the mobile robot and the trolley in FIG. 1a;

FIG. 7b: schematically represents a top view of the mobile robot and the carrier in FIG. 3a;

FIG. 13b: schematically represents a top view of the mobile robot in FIG. 13a.

DETAILED DESCRIPTION

Figure 1A:
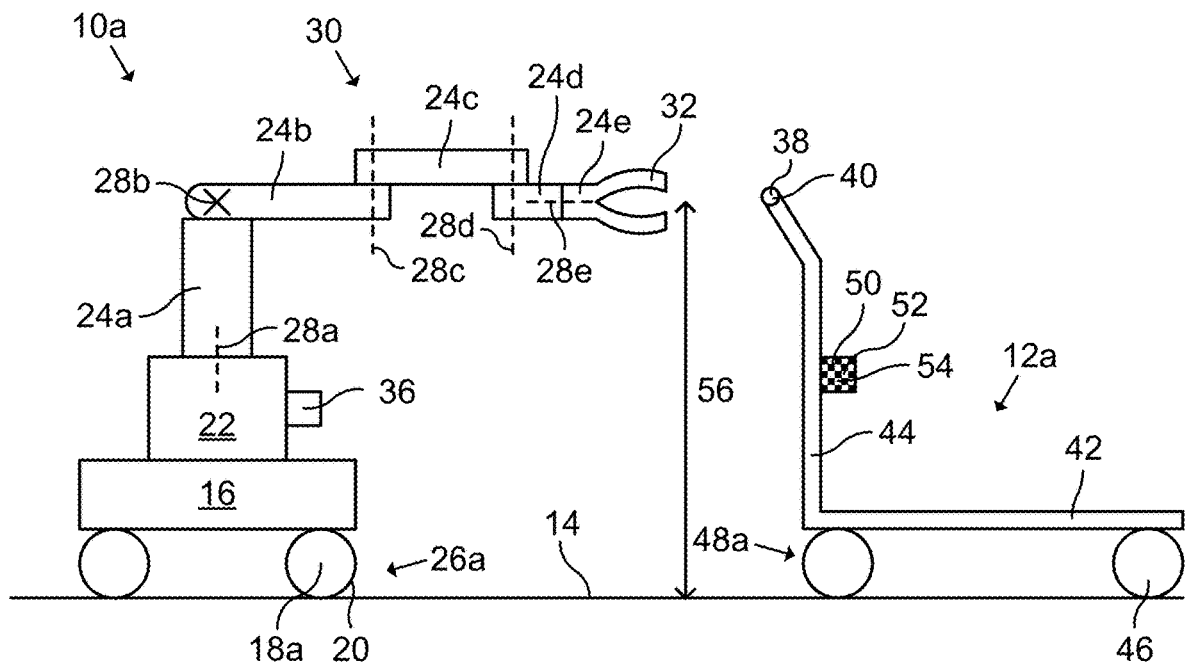
FIG. 1a: schematically represents a side view of a mobile robot and a trolley.

In the following, a method of handling a carrier by means of a mobile robot, a control system for controlling a mobile robot to handle a carrier, and a mobile robot comprising such control system, will be described. The same or similar reference numerals will be used to denote the same or similar structural features.

Figure 1B:
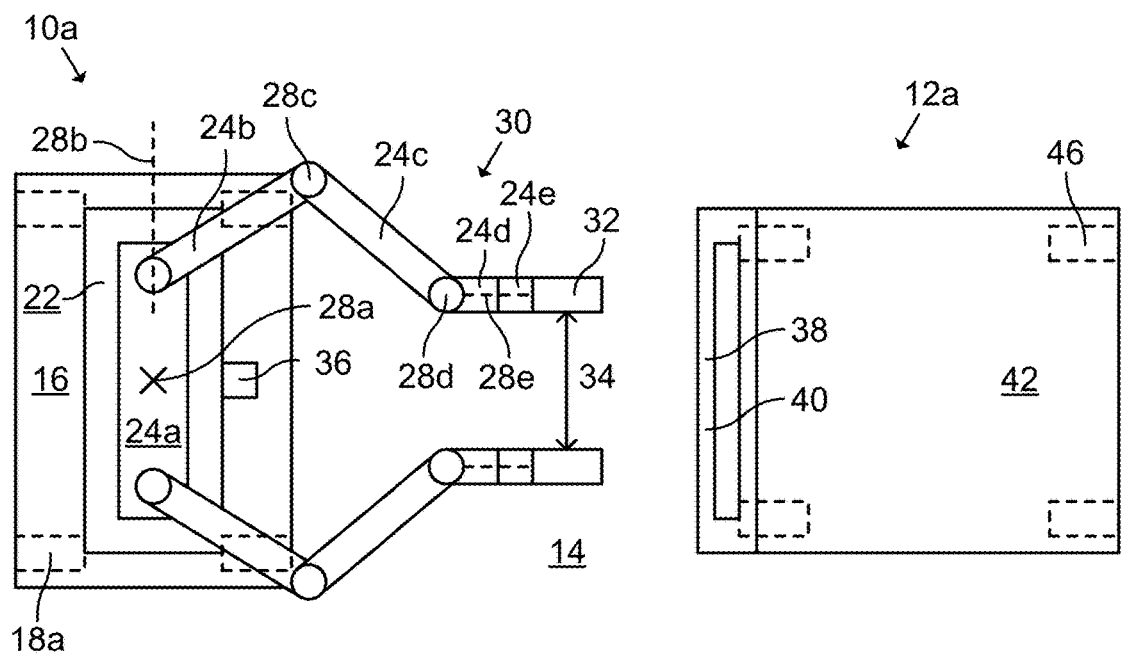

FIG. 1a schematically represents a side view of a mobile robot 10a and a trolley 12a, and FIG. 1b schematically represents a top view of the mobile robot 10a and the trolley 12a in FIG. 1a. With collective reference to FIGS. 1a and 1b, the trolley 12a is one example of a carrier according to the present disclosure. The mobile robot 10a is positioned on a horizontal floor 14. The floor 14 is one example of a surface according to the present disclosure.

The mobile robot 10a of this example comprises a body 16 and four robot wheels 18a. Each robot wheel 18a comprises a tire 20. The body 16 comprises a base 22. In this example, the base 22 is fixed to the body 16. Each robot wheel 18a is independently steerable about a vertical steering axis, and independently drivable about a drive axis, perpendicular to the respective steering axis. The body 16 and the robot wheels 18a form one example of an automated guided vehicle, AGV. By means of the robot wheels 18a, the base 22 can be moved in omnidirectional motions relative to the floor 14. This means that the base 22 can be moved in any direction along the floor 14 and can be rotated in a controlled manner and independently from its translation along its path. The robot wheels 18a form one example of a traction arrangement 26a configured to move the body 16 over the floor 14.

The mobile robot 10a further comprises a first link 24a. The first link 24a is translationally movable relative to the base 22 along a first axis 28a (vertical in FIG. 1a).

The mobile robot 10a of this example further comprises two manipulators 30. The manipulators 30 are connected to the base 22 via the first link 24a. The two manipulators 30 are of the same design. The first link 24a and the manipulators 30 form a gripping system. Each manipulator 30 comprises a second link 24b rotatable relative to the first link 24a about a second axis 28b (horizontal in FIG. 1a), a third link 24c rotatable relative to the second link 24b about a third axis 28c (vertical in FIG. 1a), a fourth link 24d rotatable relative to the third link 24c about a forth axis 28d (vertical in FIG. 1a), and a fifth link 24e rotatable relative to the fourth link 24d about a fifth axis 28e (horizontal in FIG. 1a).

Each manipulator 30 further comprises a gripper 32. The grippers 32 are examples of end effectors according to the present disclosure. The grippers 32 are connected to a respective fifth link 24e of the manipulators 30. Due to the kinematics of the manipulators 30, a horizontal distance 34 between the grippers 32 can be changed.

The mobile robot 10a further comprises a camera 36. The camera 36 is one example of an environment sensor according to the present disclosure. The camera 36 is here attached to the base 22, vertically below the manipulators 30.

The trolley 12a comprises a handle 38. The handle 38 is positioned at a handle position 40. The handle 38 is a gripping handle for being gripped by a human, here a horizontal bar. The handle 38 is positioned at approximately 1 m above the floor 14. The mobile robot 10a is configured to grip the handle 38 by means of the grippers 32.

The trolley 12a further comprises a horizontal platform 42. The trolley 12a further comprises a vertical structure 44 extending vertically from the platform 42. The handle 38 is provided on top of the vertical structure 44.

The trolley 12a further comprises four carrier wheels 46. In this example, the front pair of carrier wheels 46 are fixed direction carrier wheels and the rear pair of carrier wheels 46 (horizontally between the handle 38 and the front pair of carrier wheels 46) are caster carrier wheels. The four carrier wheels 46 form one example of a wheel configuration 48a according to the present disclosure.

The trolley 12a of this example further comprises a QR (quick response) code 50. By means of the camera 36, image data of the QR code 50 can be obtained to extract various information from the QR code 50 and/or for determining the position of the QR code 50. The QR code 50 is one example of a visual code according to the present disclosure. The QR code 50 is here positioned on the vertical structure 44, but may alternatively be positioned elsewhere on the trolley 12a. The QR code 50 of this example serves at least two purposes, to assist in determining the handle position 40 and to provide information about the wheel configuration 48a. Thus, the information in the QR code 50 can be decoded to extract the handle position 40 and the wheel configuration 48a.

In this example, the QR code 50 also constitutes an example of a positioning feature 52. The positioning feature 52 has a predetermined feature position 54 in relation to the handle position 40. Thus, the handle position 40 can either be determined by extracting the handle position 40 from the information encoded into the QR code 50, or be determined based on a known relative position between the positioning feature 52 and the handle 38, or both.

As a further alternative, the handle position 40 can be determined by image processing of image data obtained by the camera 36. In this case, the QR code 50 is not needed to provide the handle position 40. In any case, the handle position 40 can be determined with an accuracy of approximately 10 mm.

If the handle position 40 is determined by image processing, the QR code 50 may be omitted, or may be used to provide further information about the trolley 12a, such as the wheel configuration 48a, an orientation of the handle 38, dimensions of the trolley 12a, mass of the trolley 12a, mass of a payload on the platform 42, the type of carrier etc.

However, also the wheel configuration 48a may be determined in alternative ways. The wheel configuration 48a may for example be determined by image processing by means of the camera 36, or by various tests movements of the mobile robot 10a when connected to the trolley 12a.

By driving the first axis 28a, a height 56 of the grippers 32 above the floor 14 can be adjusted. Since the majorities of horizontal handles 38 for being gripped by humans are positioned at a similar height 56, the stroke of 1o the linear motion of the first axis 28a can be relatively short, e.g. approximately 150 mm. By driving the fifth axes 28e, the grippers 32 can be reoriented to grip vertical handles instead of the illustrated horizontal handle 38.

The first axis 28a is one example of a vertical degree of freedom for adjusting the height 56 of the grippers 32. The axes 28c and 28d provide one example of degrees of freedom for adjusting the horizontal distance 34 between the grippers 32. Each axis 28e is one example of a rotational degree of freedom for adjusting an orientation of each end effector.

In addition to the above five axes 28a-28e, each gripper 32 has at least one degree of freedom. The design, kinematics and number of degrees of freedom of the manipulators 30 may be greatly varied. According to one example, the manipulator 30 comprises only one degree of freedom, namely inside each gripper 32. By means of the single degree of freedom inside each gripper 32, the grippers 32 can open and close, e.g. either by a rotational degree of freedom or by a translational degree of freedom. According to an alternative example, each manipulator 30 comprises the first axis 28a but not the fifth axis 28e.

Figure 2:
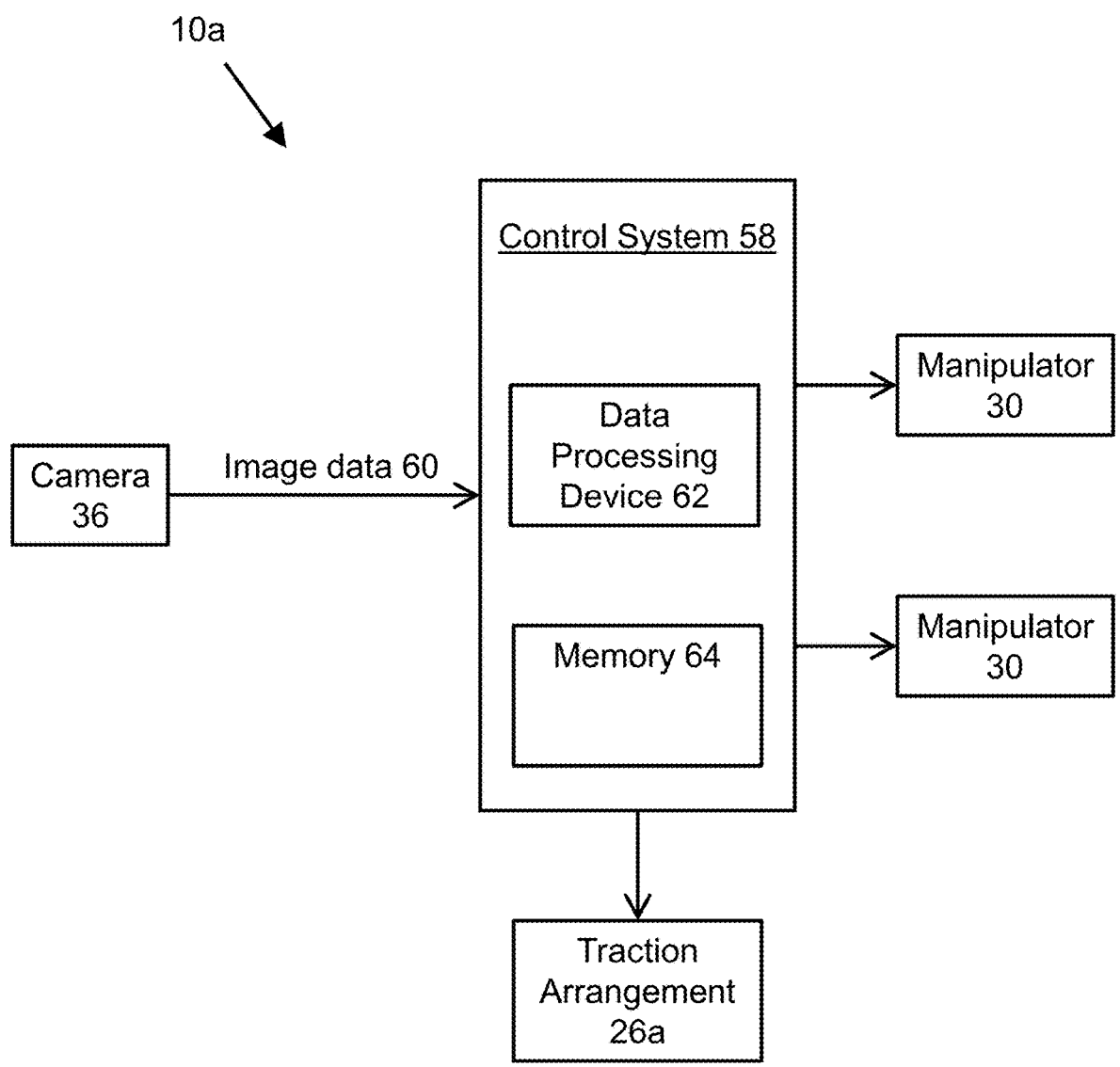
FIG. 2: schematically represents a block diagram of the mobile robot.

FIG. 2 schematically represents a block diagram of the mobile robot 10a. In addition to the camera 36, the traction arrangement 26a and the manipulators 30, the mobile robot 10a further comprises a control system 58. The camera 36 is configured to obtain image data 60 of the trolley 12a, and to send the image data 60 to the control system 58. The image data 60 is one example of environment data according to the present disclosure. The control system 58 comprises a data processing device 62 and a memory 64. The memory 64 has a computer program stored thereon. The computer program comprises program code which, when executed by the data processing device 62, causes the data processing device 62 to receive, from the camera 36, the image data 60 of the trolley 12a; determine the handle position 40 of the handle 38 based on the image data 60; command the manipulators 30 to position each gripper 32 in relation to the handle 38 based on the handle position 40; command the grippers 32 to secure to the handle 38; and command the mobile robot 10a to move in common with the trolley 12a over the floor 14 by means of the traction arrangement 26a. The computer program further comprises program code which, when executed by the data processing device 62, causes the data processing device 62 to perform, or command performance of, various steps as described herein.

Figure 3:
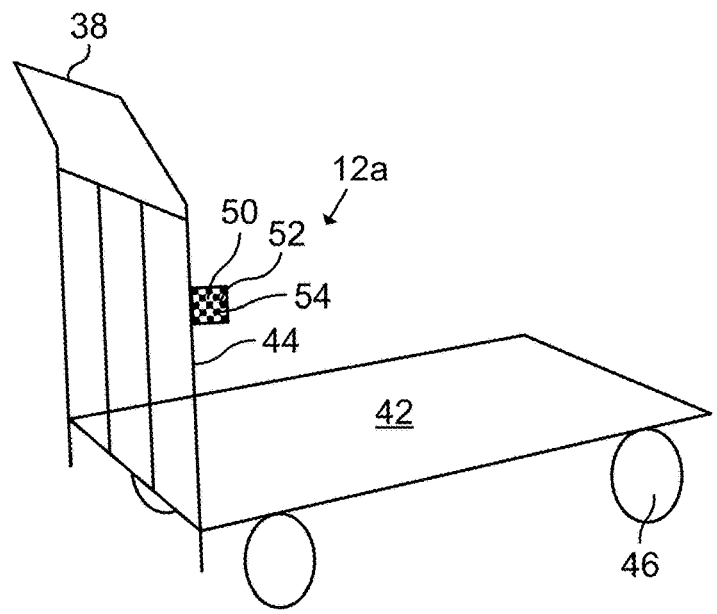
FIG. 3: schematically represents a perspective view of the trolley in FIGS. 1a and 1b.

FIG. 3 schematically represents a perspective view of the trolley 12a in FIGS. 1a and 1b. The trolley 12a in FIG. 3 can be moved by the mobile robot 10a.

Figure 4:
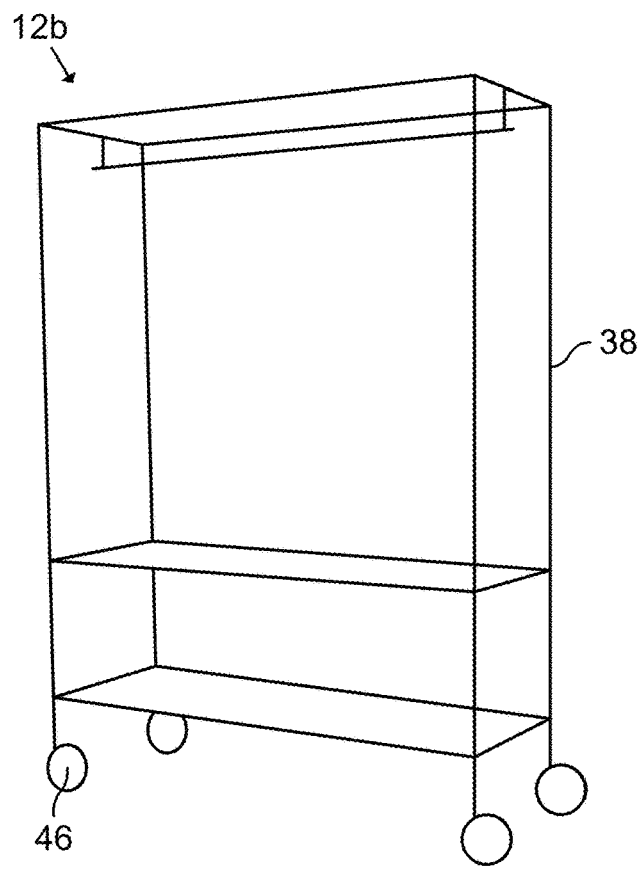
FIG. 4: schematically represents a perspective view of a further example of a trolley.

FIG. 4 schematically represents a perspective view of a further example of a trolley 12b. The trolley 12b is a further example of a carrier according to the present disclosure. The trolley 12b comprises four vertical handles 38. As shown, the vertical handles 38 are "outstretched" to fit humans of different heights. Ergonomics suggest that humans should be able to have their arms along the body and a close to 90 degree elbow angle when moving such trolley 12b. Also the trolley 12b in FIG. 4 can be moved by means of the mobile robot 10a. Clothes on hangers may be suspended in the trolley 12b. The trolley 12b comprises four caster carrier wheels 46.

Figure 5:
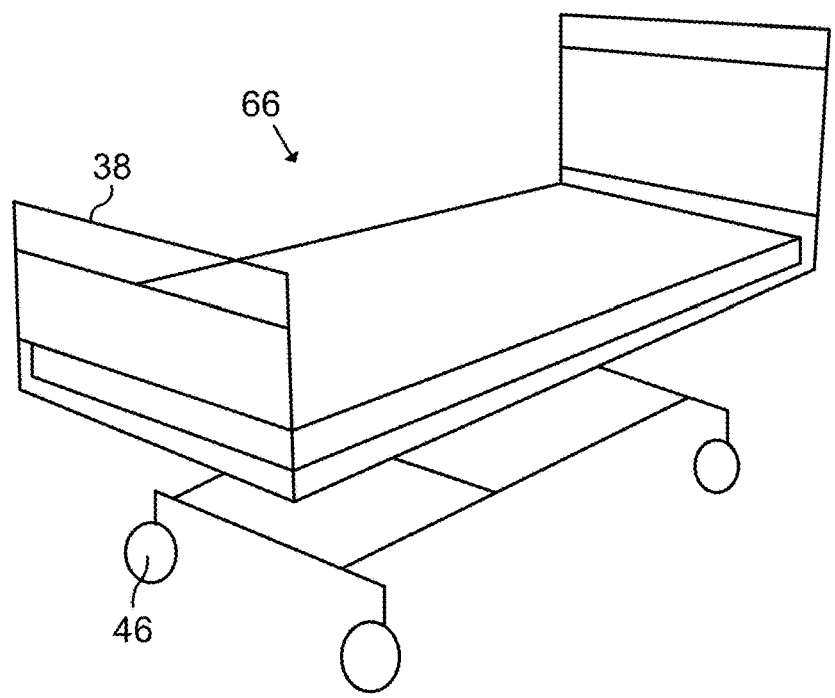
FIG. 5: schematically represents a perspective view of a hospital bed.

FIG. 5 schematically represents a perspective view of a hospital bed 66. The hospital bed 66 is a further example of a carrier according to the present disclosure. As shown in FIG. 5, the hospital bed 66 comprises a horizontal handle 38. Also the hospital bed 66 can be moved by means of the mobile robot 10a. The hospital bed 66 comprises four caster carrier wheels 46.

Figure 6:
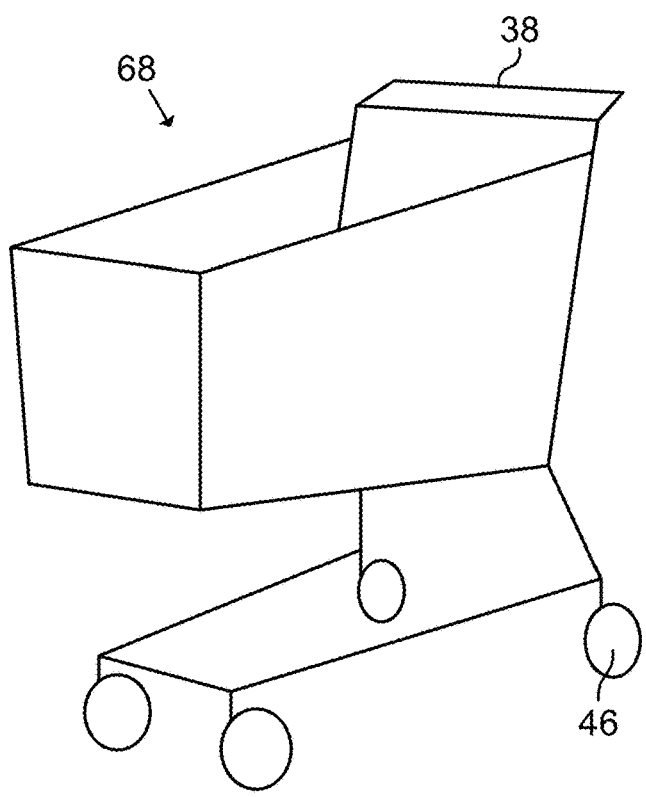
FIG. 6: schematically represents a perspective view of a shopping cart.

FIG. 6 schematically represents a perspective view of a shopping cart 68. The shopping cart 68 is a further example of a carrier according to the present disclosure. As shown in FIG. 6, the shopping cart 68 comprises a horizontal handle 38. Also the shopping cart 68 can be moved by means of the mobile robot 10a. The shopping cart 68 comprises four caster carrier wheels 46.

As can be gathered from FIGS. 3-6, most carriers have in common that they are made for humans to push or pull. To this end, most carriers have similarly looking handles 38 present at a similar height 56 above the floor 14, for example approximately 1 m above the floor 14. Each handle 38 in FIGS. 3-6 has a circular cross-sectional shape.

The present disclosure may utilize the facts that the majority of carrier handles 38 for humans have similar cross-sectional shape (to give comfortable grip for "average" human) and that there is usually a free space above the handle for horizontal handles and next to the handle for vertically oriented handles.

Figure 7A:
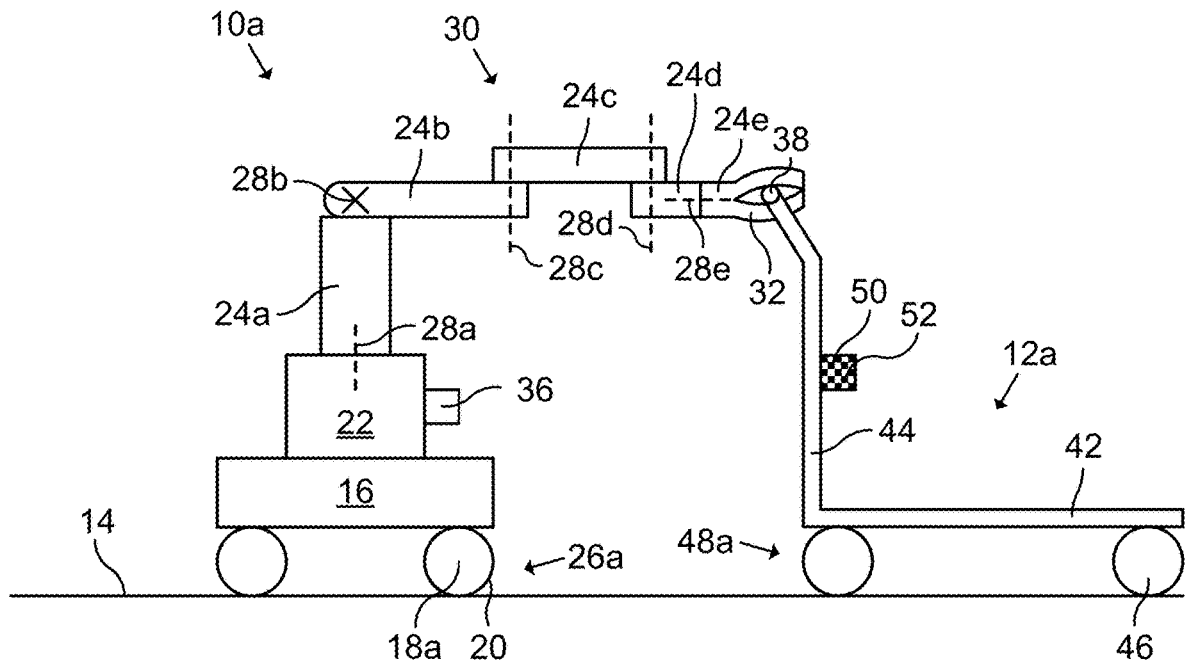
FIG. 7a: schematically represents a side view of the mobile robot when connected to the carrier.
Figure 7B:
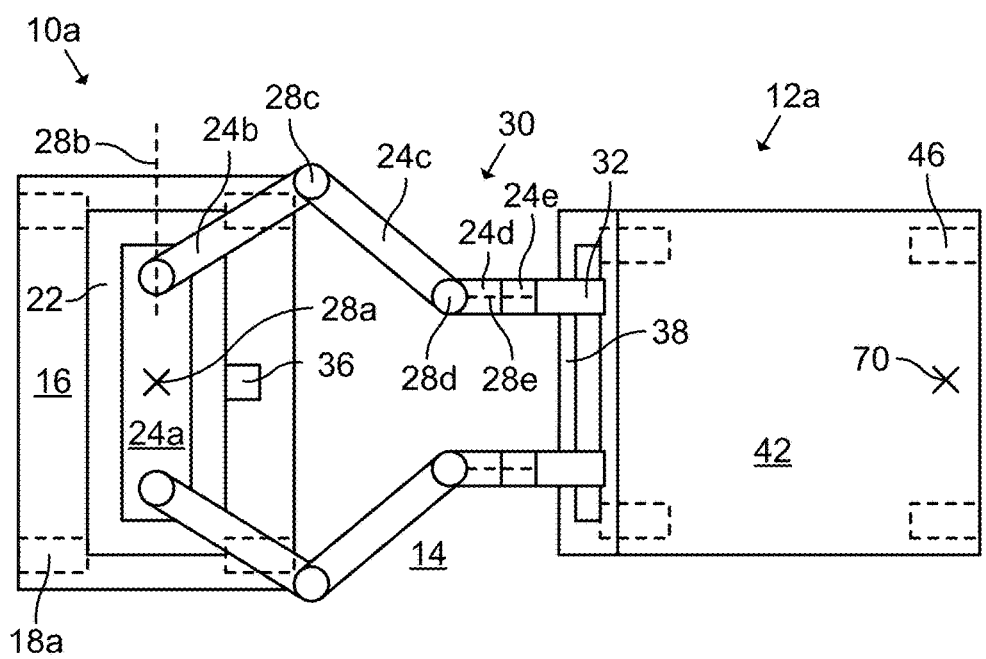

FIG. 7a schematically represents a side view of the mobile robot 10a when connected to the trolley 12a, and FIG. 7b schematically represents a top view of the mobile robot 10a and the trolley 12a in FIG. 7a. With collective reference to FIGS. 7a and 7b, the grippers 32 have been secured to the handle 38 after being positioned in relation to the handle position 40 by means of the manipulators 30. The grippers 32 enable both a gripping of the handle 38 and a locking of these grips. The gripper 32 is now locked in this state during transport of the trolley 12a. During movement of the mobile robot 10a together with the trolley 12a, any forces between the mobile robot 10a and the trolley 12a are transferred only via the two grippers 32 and the 3o handle 38.

Moreover, when the grippers 32 are connected to the handle 38, the forces to the second axes 28b are reduced or eliminated, e.g. by reducing power to a motor driving the respective second axes 28b. The manipulators 30 thereby lean onto the handle 38. In this way, the first link 24a and the second links 24b are allowed to move relative to each other about the second axis 28b. In this way, the mobile robot 10a utilizes the trolley 12a for stabilization and the ability to travel over uneven surfaces is significantly improved.

The two grippers 32 provide two geometrically separated points of connection that can completely transfer all forces and moments (three forces and three moments) at least in a horizontal plane between the trolley 12a and the mobile robot 10a. This has the advantage that an increased maneuverability of a robot carrier system comprising the mobile robot 10a and the trolley 12a is provided.

FIG. 7b further shows a carrier navigation point 70. The position of the carrier navigation point 70 is determined in relation to the mobile robot 10a. Since the wheel configuration 48a of the trolley 12a comprises a front pair of carrier wheels 46 constituted by fixed direction carrier wheels and a rear pair of carrier wheels 46 constituted by caster carrier wheels, the carrier navigation point 70 is set between the front pair of carrier wheels 46. The movements of the robot carrier system are therefore controlled based on the wheel configuration 48a.

Figure 8:
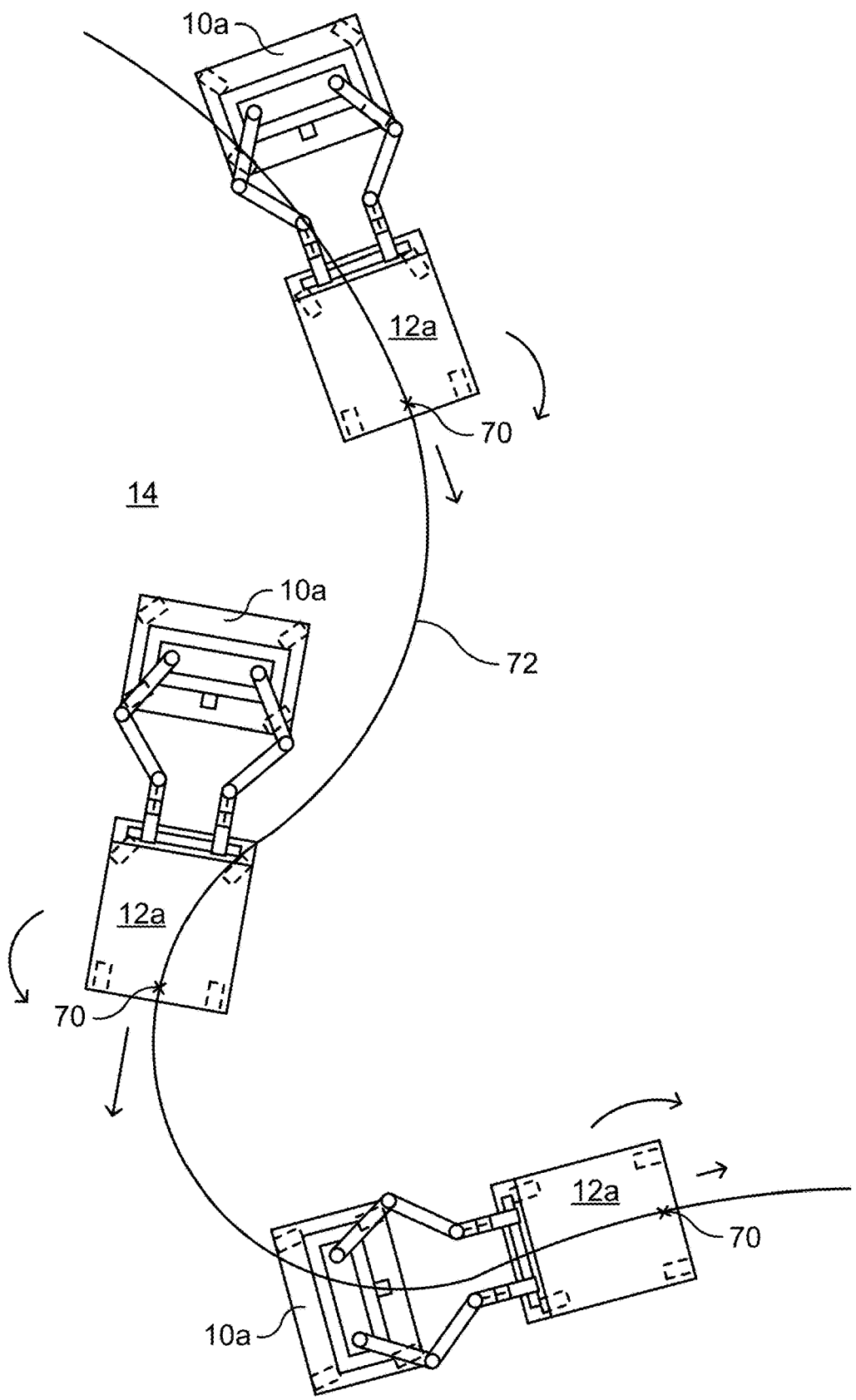
FIG. 8: schematically represents a top view of a common movement of the mobile robot and the carrier.

FIG. 8 schematically represents a common movement of the mobile robot 10a and the trolley 12a along a path 72. The path 72 comprises a variety of different types of curves. The control system 58 plans movement of the robot carrier system based on the position of the carrier navigation point 70. As shown in FIG. 8, the carrier navigation point 70 is always positioned on the path 72. The various movement states in FIG. 8 serve to illustrate that the carrier navigation point 70 defined in relation to the trolley 12a is used for navigation control, rather than a center point of the mobile robot 10a (although the carrier navigation point 70 can be coinciding with the center point of the mobile robot 10a when moving carriers with different wheel configurations 48a). The navigation possibilities provided by the mobile robot 10a has great value, for example when the trolley 12a needs to be picked up in, or delivered to a tight space, and during navigation through narrow corridors. The omnidirectional motion of the base 22 enables the trolley 12a to be picked up in any rotation at a pickup location, to be moved and rotated in any rotation, and to be delivered in any rotation at a delivery location.

In the upper illustration in FIG. 8, the robot carrier system travels at a medium speed and with a medium clockwise rotational speed. In the middle illustration in FIG. 8, the robot carrier system travels at a relatively high speed and with a relatively high clockwise rotational speed. In the lower illustration in FIG. 8, the robot carrier system travels at a relatively low speed and with a relatively low clockwise rotational speed. The example movements of the robot carrier system in FIG. 8 require omnidirectional motion of the base 22 relative to the floor 14.

Figure 9:
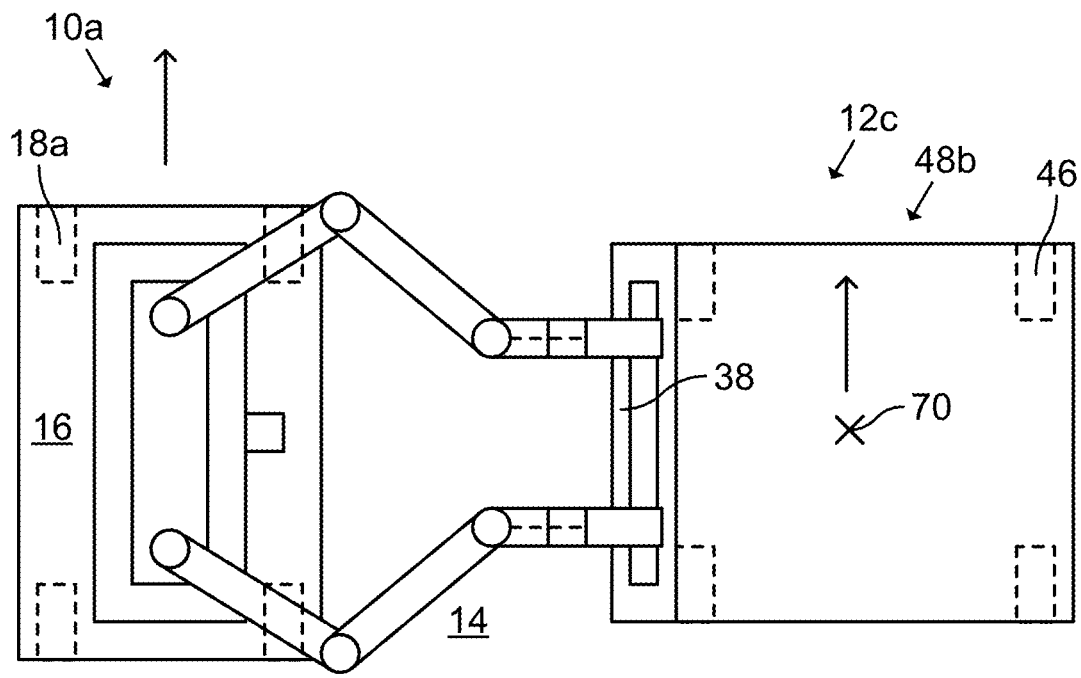
FIG. 9: schematically represents a top view of a further example of a carrier and a common movement of the mobile robot and the carrier.

FIG. 9 schematically represents a top view of a further example of a trolley 12c and a common movement of the mobile robot 10a and the trolley 12c. The trolley 12c constitutes a further example of a carrier according to the present disclosure. The only difference between the trolley 12c and the trolley 12a is that a wheel configuration 48b of the trolley 12c comprises four caster carrier wheels 46 (and no fixed direction carrier wheels). For this reason, the carrier navigation point 70 can be positioned arbitrarily in relation to the mobile robot 10a. In this example, the carrier navigation point 70 is positioned at a geometrical center point of the trolley 12c. As shown in FIG. 9, the robot carrier system can move straight sideways, i.e. in a direction perpendicular to a separating direction between the body 16 and the trolley 12c.

Figure 10:
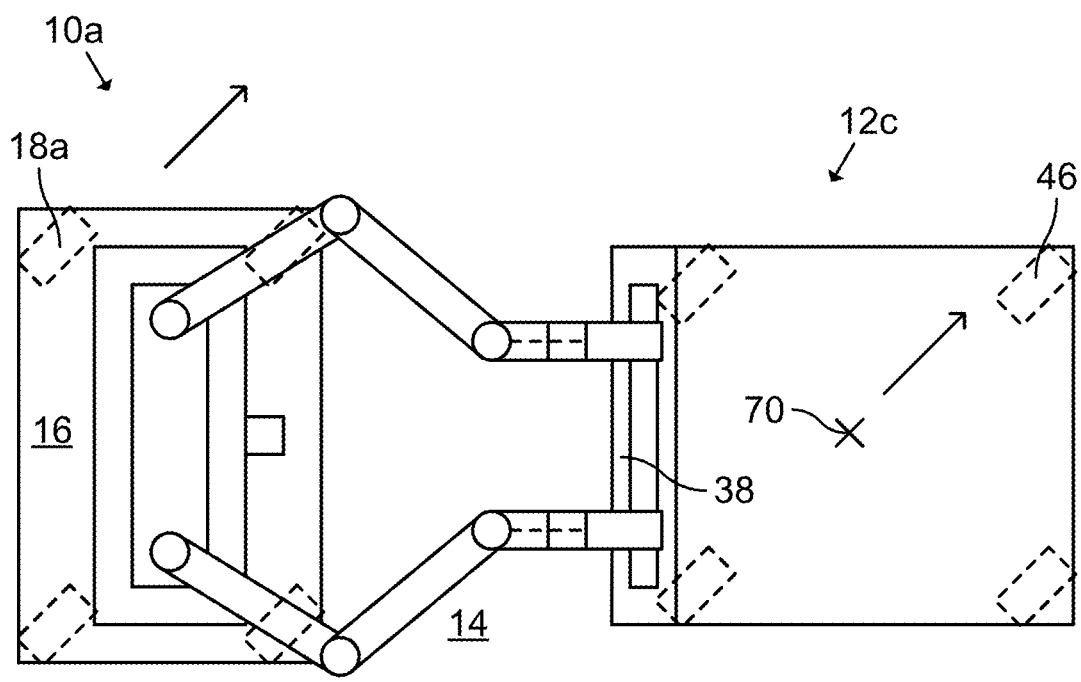
FIG. 10: schematically represents a top view of a further example of a common movement of the mobile robot and the carrier in FIG. 9.

FIG. 10 schematically represents a top view of a further example of a common movement of the mobile robot 10a and the trolley 12c in FIG. 9. As shown in FIG. 10, the robot carrier system can move at an angle, here in a direction angled 45 degrees to a separating direction between the body 16 and the trolley 12c. A transition between the movement in FIG. 9 and the movement in FIG. 10 requires an omnidirectional motion of the base 22 relative to the floor 14.

Figure 11:
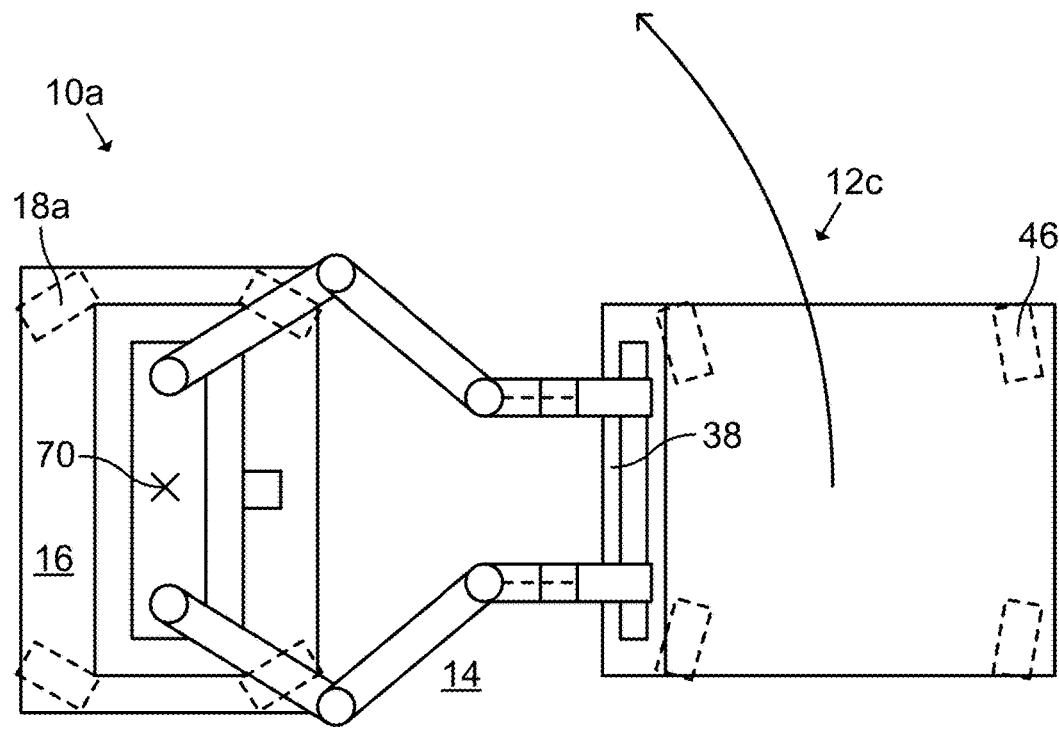
FIG. 11: schematically represents a top view of a further example of a common movement of the mobile robot and the carrier in FIGS. 9 and 10.

FIG. 11 schematically represents a top view of a further example of a common movement of the mobile robot 10a and the trolley 12c in FIGS. 9 and 10. In FIG. 11, the carrier navigation point 70 is positioned at a geometrical center point of the body 16. The trolley 12c can thereby be rotated around the mobile robot 10a while the mobile robot 10a rotates on the spot.

Figure 12:
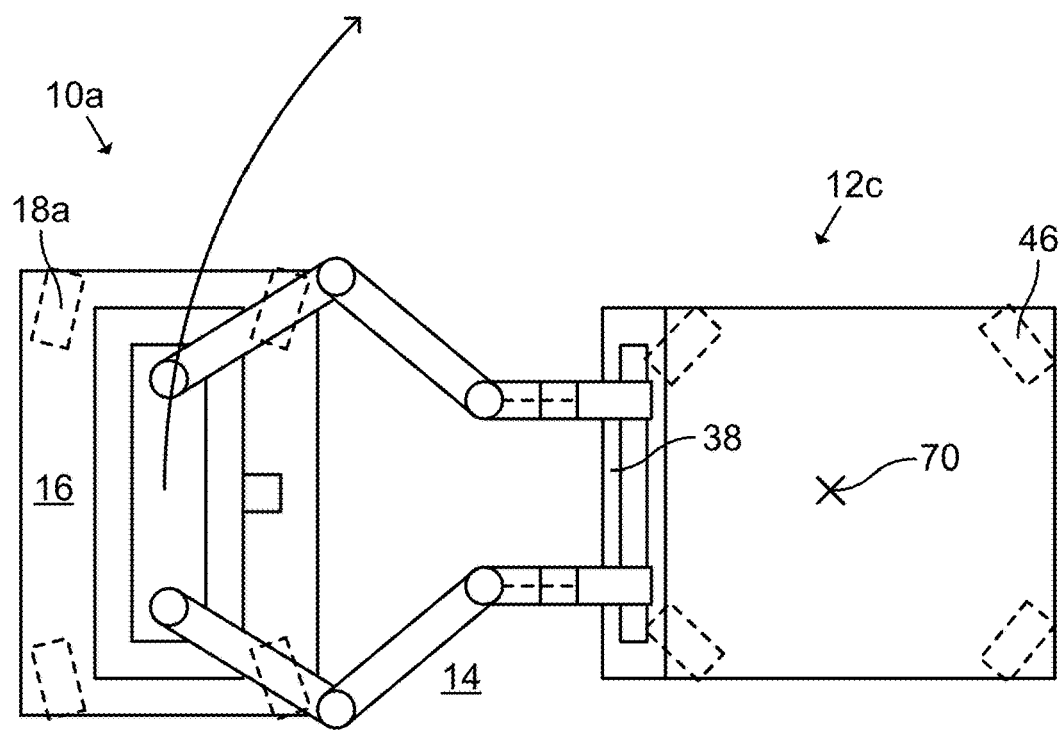
FIG. 12: schematically represents a top view of a further example of a common movement of the mobile robot and the carrier in FIGS. 9 to 11.

FIG. 12 schematically represents a top view of a further example of a common movement of the mobile robot 10a and the trolley 12c in FIGS. 9 to 11. In FIG. 12, the carrier navigation point 70 is again positioned at the geometrical center point of the trolley 12c. The mobile robot 10a can thereby be rotated around the trolley 12c while the trolley 12c rotates on the spot. As particularly shown in FIGS. 8 to 12, the mobile robot 10a has full control over the movement of the trolley 12c in the horizontal plane. The movement of the robot carrier system in FIG. 12 requires omnidirectional motion of the base 22 relative to the floor 14.

Figure 13A:
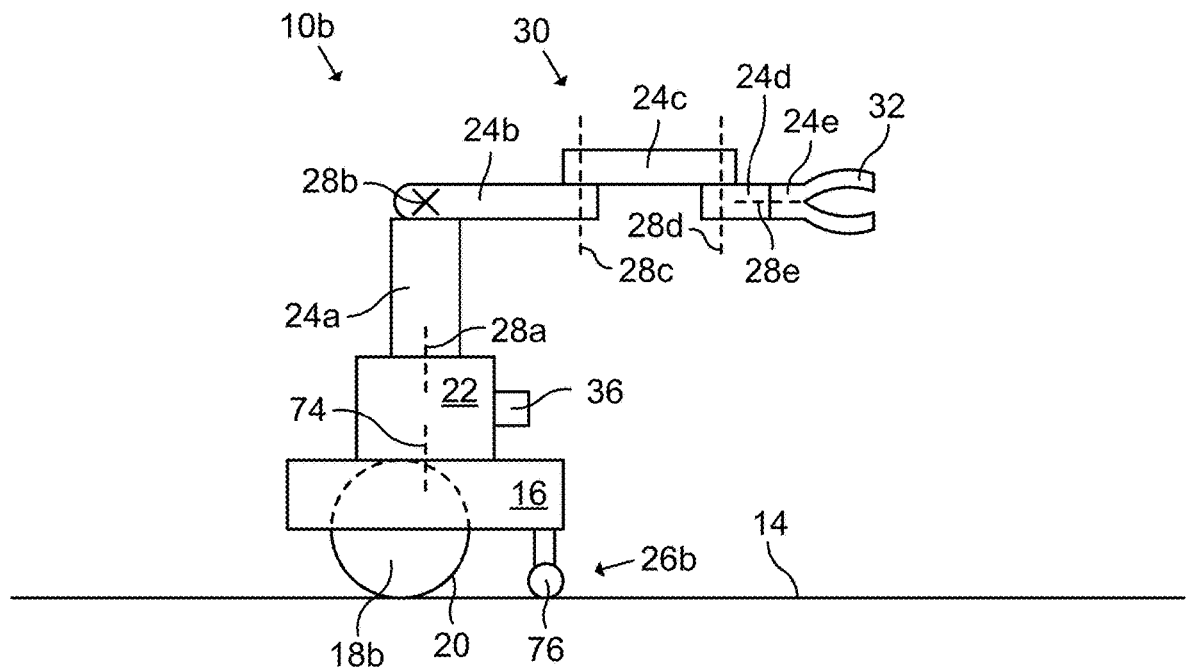
FIG. 13a: schematically represents a side view of a further example of a mobile robot.
Figure 13B:
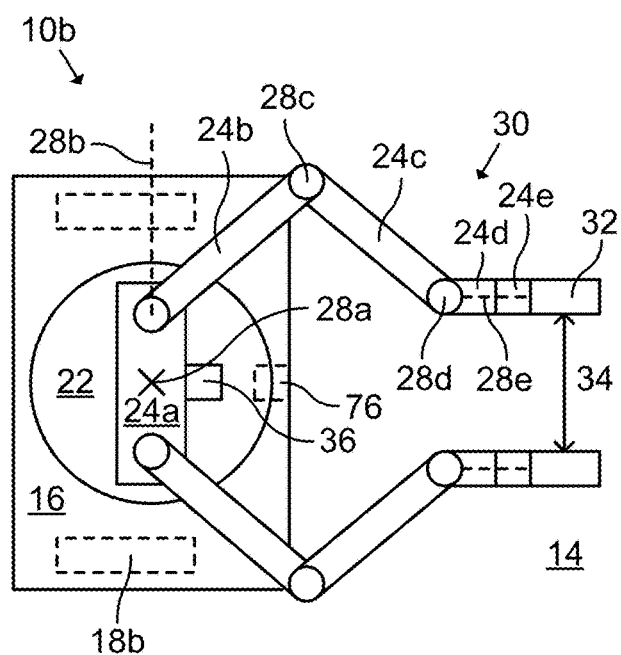

FIG. 13a schematically represents a side view of a further example of a mobile robot 10b, and FIG. 13b schematically represents a top view of the mobile robot 10b in FIG. 13a. With collective reference to FIGS. 13a and 13b, the mobile robot 10b differs from the mobile robot 10a only in that the mobile robot 10b comprises a different traction arrangement 26b and in that the base 22 is rotatable relative to the body 16 about a vertical axis 74.

The traction arrangement 26b comprises two fixed direction robot wheels 18b forming a differential drive. The traction arrangement 26b further comprises an optional robot caster wheel 76. Each robot wheel 18b comprises a tire 20. The robot wheels 18b provide two degrees of freedom and the rotation of the base 22 relative to the body 16 provides a third degree of freedom. Thereby, also the base 22 of the mobile robot 10b can be moved in an omnidirectional motion. The body 16, the base 22 and the traction arrangement 26b in FIGS. 13a and 13b form a further example of an AGV.

By means of the robot wheels 18b, the body 16 can be rotated about a rotation axis (not illustrated). In this example, this rotation axis is offset from the vertical axis 74, but these axes may alternatively be coinciding. The traction arrangement 26b is more cost effective than the traction arrangement 26a. On the other hand, the body 16 will be more stiff, stable and powerful with the traction arrangement 26a for a given rating of the robot wheels 18a and 18b.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of handling a carrier via a mobile robot, the mobile robot including:
a body having a base;
a traction arrangement configured to move the body over a surface;
at least one manipulator connected to the base; and
at least one end effector movable relative to the base via the at least one manipulator;
wherein the mobile robot is configured to perform an omnidirectional motion of the base relative to the surface;
the method comprising:
obtaining environment data of a carrier positioned on the surface via an environment sensor;
determining a handle position of at least one handle of the carrier based on the environment data;
positioning each end effector in relation to at least one handle based on the one or more handle positions;
securing each end effector to the at least one handle; and
moving the mobile robot and the carrier in common over the surface via the mobile robot;
wherein the at least one manipulator comprises a link rotatable about a horizontal axis, and wherein the method further includes reducing a support of the link after securing each end effector to the at least one handle.

2. The method according to claim 1, further comprising:
determining a carrier navigation point in relation to the mobile robot; and
controlling movements of the mobile robot based on the carrier navigation point when the mobile robot moves in common with the carrier.

3. The method according to claim 1, further comprising:
determining a wheel configuration of the carrier; and
controlling movements of the mobile robot based on the wheel configuration when the mobile robot moves in common with the carrier.

4. The method according to claim 1, wherein the obtaining of environment data includes reading a visual code provided on the carrier via the environment sensor, and wherein the method further includes extracting information from the visual code.

5. The method according to claim 1, further comprising obtaining environment data of a positioning feature on the carrier having a predetermined feature position in relation to the at least one handle position, determining the feature position via processing of the environment data, and determining the at least one handle position based on the feature position.

6. A control system for controlling a mobile robot to handle a carrier, the mobile robot including:
a body having a base;
a traction arrangement configured to move the body over a surface;
at least one manipulator connected to the base the at least one manipulator having a link rotatable about a horizontal axis; and
at least one end effector movable relative to the base via the at least one manipulator;
wherein the mobile robot is configured to perform an omnidirectional motion of the base relative to the surface;
the control system comprising at least one data processing device and at least one memory having a computer program stored thereon, the computer program including program code which, when executed by the at least one data processing device, causes the at least one data processing device to perform the steps of:
receiving, from an environment sensor, environment data of a carrier positioned on the surface;
determining a handle position of at least one handle of the carrier based on the environment data;
commanding the at least one manipulator to position each end effector in relation to at least one handle based on the one or more handle positions;
commanding the at least one end effector to secure to the at least one handle; and
commanding the mobile robot to move in common with the carrier over the surface;
wherein the computer program includes program code which, when executed by the at least one data processing device, causes the at least one data processing device to perform the step of commanding the manipulator to reduce a support of the link after securing each end effector to the at least one handle.

7. The control system according to claim 6, wherein the computer program comprises program code which, when executed by the at least one data processing device, causes the at least one data processing device to perform the steps of:
determining a carrier navigation point in relation to the mobile robot; and
controlling movements of the mobile robot based on the carrier navigation point when the mobile robot moves in common with the carrier.

8. The control system according to claim 6, wherein the computer program comprises program code which, when executed by the at least one data processing device, causes the at least one data processing device to perform the steps of:
determining a wheel configuration of the carrier; and
controlling movements of the mobile robot based on the wheel configuration when the mobile robot moves in common with the carrier.

9. The control system according to claim 6, wherein the computer program comprises program code which, when executed by the at least one data processing device, causes the at least one data processing device to perform the steps of:
commanding the environment sensor to read a visual code provided on the carrier; and
extracting information from the visual code.

10. The control system according to claim 6, wherein the computer program comprises program code which, when executed by the at least one data processing device, causes the at least one data processing device to perform the steps of:
receiving, from the environment sensor, environment data of a positioning feature on the carrier having a predetermined feature position in relation to the at least one handle position;
determining the feature position via processing of the environment data; and
determining the at least one handle position based on the feature position.

11. A mobile robot comprising:
a body having a base;
a traction arrangement configured to move the body over a surface;
at least one manipulator connected to the base, the at least manipulator having a link rotatable about a horizontal axis;
at least one end effector movable relative to the base via the at least one manipulator; and
a control system to handle a carrier,
the control system including at least one data processing device and at least one memory having a computer program stored thereon, the computer program including program code which, when executed by the at least one data processing device, causes the at least one data processing device to perform the steps of:
receiving, from an environment sensor, environment data of a carrier positioned on the surface;
determining a handle position of at least one handle of the carrier based on the environment data;
commanding the at least one manipulator to position each end effector in relation to at least one handle based on the one or more handle positions;
commanding the at least one end effector to secure to the at least one handle; and
commanding the mobile robot to move in common with the carrier over the surface; and
wherein the mobile robot is configured to perform an omnidirectional motion of the base relative to the surface;
wherein the computer program includes program code which, when executed by the at least one data processing device, causes the at least one data processing device to perform the step of commanding the manipulator to reduce a support of the link after securing each end effector to the at least one handle.

12. The mobile robot according to claim 11, wherein the traction arrangement comprises at least two robot wheels having a tire.

* * * * *